United States Patent Office 3,804,751
Patented Apr. 16, 1974

3,804,751
DISPOSAL OF WASTES CONTAINING MERCURY
Andrew T. McCord, Snyder, and Louis E. Wagner, Elma, N.Y., assignors to Chem-Trol Pollution Services, Inc., Model City, N.Y.
No Drawing. Filed Jan. 19, 1973, Ser. No. 325,107
Int. Cl. C02b 1/20
U.S. Cl. 210—50          11 Claims

ABSTRACT OF THE DISCLOSURE

A method of disposing of wastes containing metallic mercury by treating such wastes with sulphuric acid and then neutralizing the treated wastes with a lime slurry to convert the metallic mercury into an insoluble form of mercury under neutral and alkaline conditions.

BACKGROUND OF THE INVENTION

This invention relates generally to the treatment of wastes containing mercury and, more particularly, to a process for treating or handling waste mercury muds generated from mercury cell processes.

One of the major problems encountered in the disposition of mercury wastes, particularly those mercury waste sludges or muds generated from mercury cathode electrolytic cells, is the safe disposition of the metallic mercury contained therein. The problem resides in the vapor pressure of metallic mercury, which is 0.00277 mm. Hg at ambient temperatures. Investigations have demonstrated that if metallic mercury is placed in an enclosed flask, the atmosphere in the flask will eventually become saturated with mercury vapor to the extent of about 24 parts per million. Therefore, if mercury sludges or muds contain metallic mercury, it follows that the atmosphere above such muds can contain dangerous quantities of mercury.

Attempts have been made to destroy the metallic mercury in these wastes or muds by converting the metallic mercury into compounds. One common approach is to treat the mercury muds with sulphide to produce mercury sulphide, which is considered insoluble and is buried along with the muds as landfill. However, it has been found that any alkalinity will cause some dissolution of the mercury and the liquid portion obtained by redissolution can obtain several parts per million of soluble mercury which can leach out and ultimately find its way to our streams and other natural waters for possible consumption by marine life and directly or indirectly by human beings.

SUMMARY OF THE INVENTION

Accordingly, it is a primary object of the present invention to provide a simple method of treating wastes or muds containing metallic mercury in a manner converting the metallic mercury to an insoluble form of mercury under neutral or alkaline conditions.

It is another object of this invention to provide a method of treating mercury muds to destroy substantially all the metallic mercury contained therein by conversion into insoluble mercuric carbonate in neutral and alkaline environments.

It is a further object of this invention to provide a method of treating waste mercury muds with spent pickle liquor to safely dispose of both waste materials.

The foregoing and other objects, advantages and characterizing features of the present invention will become clearly apparent from the ensuing detailed description thereof.

DETAILED DESCRIPTION OF AN ILLUSTRATIVE EMBODIMENT

The bulk of the waste streams containing mercury consist of muds generated in the mercury cell process and dilute liquors containing small quantities of soluble mercury compounds. While the process of this invention will be conveniently described in connection with the treatment of mercury muds generated in the mercury cell process, it should be understood that this invention is in no sense limited thereto, but has utility in treating wastes containing mercury evolved from any source or process.

In the mercury cell process, liquid mercury is used as the cathode in the electrolysis of an aqueous sodium chloride solution to form chlorine, hydrogen and sodium hydroxide. The raw material, salt, is extracted along with spent electrolyte from the mercury cell process. The spent electrolyte is a strong sodium chloride solution, saturated with chlorine, which is removed after the spent electrolyte is removed from the mercury cell process. The chlorine free electrolyte, which contains some sodium chlorate and perchlorate, is mixed with other waste streams from the process which often contain finely divided metallic mercury. The crude salt contains sand, clay, and many metallic impurities. After the waste electrolyte is used to dissolve the salt, it is usually treated with lime or calcium carbonate which precipitates metallic impurities in the form of hydroxides or carbonates. The clean brine is then returned to the mercury cell for further electrolysis. The precipitate, together with the sand, clay, etc. constitute the waste muds to be treated by the process of this invention.

A typical mercury waste mud can contain sand, clay, alumina, iron hydrate, sodium chloride, sodium hydroxide, calcium carbonate, sodium chlorates and perchlorates, mercuric chloride, mercuric oxide and metallic mercury. Metallic mercury could be the most harmful ingredient in these muds, which are often used as landfill or simply buried beneath the earth's surface as a convenient mode of disposal.

Such typical muds can contain up to 35% calcium carbonate, up to 50% total solids, and may contain as much as 1000 parts of mercury, both soluble and insoluble, per million parts of waste muds. Since the metallic mercury exerts a vapor pressure of 0.002777 mm. Hg at 30° C., the atmosphere surrounding such muds may contain up to 24 p.p.m. Hg at 30° C. Accordingly, it is essential to destroy all of the metallic mercury in such wastes by conversion into some compound, preferably an insoluble compound, preferably an insoluble compound with negligible vapor pressure, before burying such wastes.

The conventional practice is to treat such muds with sulphide to obtain insoluble mercury sulphide and bury the latter along with the muds. However, it has been found that any alkalinity in the system will effect some redissolution of the mercury and the liquid portion of the muds can contain several parts per million of soluble mercury. Utilizing the method of atomic absorption, an analysis of the liquid portion of waste mercury muds treated with sodium sulphide in the well known manner practiced in industry to convert the mercury into mercury sulphide analyzed 110 parts per billion of soluble mercury. Repeating this treating operation with an excess of sodium sulphide so that the final pH was adjusted to 9 yielded a filtrate, i.e. the liquid portion of the muds, containing 3600 parts per billion of soluble mercury. The above analysis clearly demonstrated that mercury sulphide becomes soluble in an alkaline environment and when buried with the muds, can leach out to contaminate natural streams and waters.

In accordance with the process of the present invention, the waste muds containing metallic mercury are treated in a manner producing an insoluble form of mercury which remains insoluble in the muds under neutral or alkaline conditions, thereby rendering the waste muds harmless or more desirable as a landfill. To this end, the waste muds generated in the mercury cell process, and which contain approximately 35% $CaCO_3$ along with metallic mercury, are mixed with dilute sulphuric acid. In lieu of diluted sulphuric acid, the muds can be blended with a pickle liquor, which is generated as a waste material in the pickling of steel and which contains sulphuric acid. The usual spent pickle liquor contains a mixture of about 3 to 10% sulphuric acid ($H_2SO_4$) and about 5–19% ferrous sulphate ($FeSO_4$). Using spent pickle liquor solves the problem of disposing of this waste material along with the disposal of waste mercury muds.

Mixing the diluted sulphuric acid or pickle liquor with the waste muds converts the calcium carbonate to calcium sulphate according to the following equation:

$$CaCO_3 + H_2SO_4 \rightarrow CaSO_4 + CO_2 + H_2O$$

The sodium chlorate and perchlorate in the muds react with the acid to produce chloric and perchloric acid, respectively, according to the following:

$$2NaClO_3 + H_2SO_4 \rightarrow 2HClO_3 + Na_2SO_4$$

$$2NaClO_4 + H_2SO_4 \rightarrow 2HClO_4 + Na_2SO_4$$

Any finely divided mercury is oxidized to mercury chloride or mercuric oxide as follows:

$$Hg + 2HClO_3 \rightarrow HgCl_2 + H_2O + O_2$$

$$Hg + HClO_3 \rightarrow HgO + HCl + O_2$$

Thus, all the metallic mercury is destroyed by conversion into some mercury compound.

The resulting muds are further diluted with an equal or greater amount by weight of spent pickle liquor. The ratio of spent pickle liquor to the muds can range from one to one to twenty to one by weight, so long as there is sufficient sulphuric acid in the pickle liquor to react with the minor amount of mercury present in the muds. All of the calcium carbonate is converted to calcium sulphate and carbon dioxide is released. The above mercury compounds, and others that may be present in the waste muds, are converted to basic sulphates as illustrated, for example, by the following equations:

(a)

$$3HgO + H_2SO_4 \rightarrow HgSO_4 \cdot 2HgO + H_2O$$

(b)

(1) $\quad HgCl_2 + H_2SO_4 \rightarrow HgSO_4 + 2HCl$ (2) $\quad HgSO_4 + 2HgO \rightarrow HgSO_4 \cdot 2HgO$ The resulting slurry is then neutralized to about 7.5 pH with a thick lime slurry. The percentage of lime or calcium oxide in the slurry can range from about 5% to 28%, and preferably 15–25%. Calcium oxide concentrations above and below this preferred range are practical, but not desirable. The calcium carbonate present in the lime slurry reacts with the mercuric sulphate to produce insoluble basic mercury carbonate according to the following equation:

$$HgSO_4 \cdot 2HgO + CaCO_3 \rightarrow HgCO_3 \cdot 2HgO + CaSO_4$$

Thus, any metallic mercury present in the waste sludges is converted to an insoluble form of mercury, namely basic mercuric carbonate, which remains insoluble under neutral or alkaline conditions and, as such, forms a highly desirable landfill material. We have found that large concentrations of chlorides, such as sodium chloride or calcium chloride, do not solubilize the insoluble basic mercury carbonates.

The following example further illustrates the principles of this invention, but it is not to be construed as limiting the invention thereto.

EXAMPLE I 500 gallons of mercury sludge or mud was slurried in 5000 gallons of spent pickle liquor. The composition of the mercury sludge was analyzed as having the following ingredients:

| Ingredients: | Percent by weight |
|---|---|
| Sodium chloride | 20 |
| Chlorates and perchlorate | 1 |
| Calcium carbonate | 35 |
| Insolubles, sand oxides, alumina, etc. | 13 |
| Water | 31 |

The metallic mercury content in the sample sludge was 100,000 parts per billion. The pickle liquor analyzed ferrous sulphate at 18.3% by weight and sulphuric acid at 8.2% by weight.

All of the calcium carbonate dissolved in the pickle liquor producing calcium sulphate and carbon dioxide was released.

The resulting slurry was then neutralized to 7.5 pH with 2000 gallons of a 15–25% lime slurry, i.e. 15–25% calcium oxide, in a centrifugal reactor or neutralizer of the type disclosed in copending patent application Ser. No. 182,941, filed Sept. 23, 1971 and assigned to the same assignee as the present invention. The calcium carbonate in the lime slurry reacted with the mercuric sulphate to produce insoluble mercuric carbonate.

The mixture discharged from the neutralizer was a solid mass in the form of a heavy unpumpable paste containing some liquid. A quantity of this paste was filtered in a vacuum filter, and the filtrate or liquid phase analyzed less than 10 parts per billion of soluble mercury immediately after formation and also after several days as determined by the method of atomic absorption. The mercury in the solid phase consisted of basic mercuric carbonate, which is not soluble even at 9 pH.

From the foregoing, it is apparent that the objects of the present invention have been fully accomplished. As a result of this invention a novel method is provided for disposing of wastes containing metallic mercury by treating the wastes in a manner converting the metallic mercury into an insoluble form of mercury. The wastes are treated with dilute sulphuric acid or a spent pickle liquor comprising sulphuric acid to convert the metallic mercury into mercury compounds, which are then converted into basic sulphates by blending the treated wastes with about ten times their weight of spent pickle liquor. The resulting slurry is then neutralized to 7.5 pH with a heavy lime slurry to convert the mercuric sulphate to basic mercuric carbonate, which is insoluble in neutral and alkaline environments up to as high as 9 pH. The neutralization process produces a solid mass having about a 50% liquid phase, which analyzes less than 10 p.p.b. of soluble mercury. Utilizing spent pickle liquor in the process of this invention solves the problem of disposing of this waste material along with the disposal of the waste mercury muds. The resulting product can be safely used as landfill without concern about contaminating or polluting the environment.

While the foregoing method of this invention has been disclosed in detail, it is to be understood that this has been done by way of illustration only.

We claim:

1. A method of disposing of wastes containing calcium carbonate and metallic mercury comprising: treating the wastes with a minor amount of sulphuric acid to convert the metallic mercury in said wastes to mercuric compounds; blending the treated wastes with a substantial amount of spent pickle liquor to convert the mercuric compounds to basic mercuric sulphates; and neutralizing the resulting product with a heavy lime slurry to obtain a solid mass comprising an insoluble form of mercury and having a small portion of liquid containing less than 10 parts per billion of soluble mercury.

2. A method according to claim 1 wherein said wastes are treated with spent pickle liquor containing said minor amount of sulphuric acid.

3. A method according to claim 1 wherein the ratio of said pickle liquor to said treated wastes ranges from about one to one by weight to twenty to one by weight.

4. A method according to claim 1 wherein the ratio of said pickle liquor to said treated wastes is about ten to one by weight.

5. A method according to claim 1 wherein said lime slurry contains calcium oxide present in an amount of from 5 to 28% by weight of the total weight of said lime slurry.

6. A method according to claim 1 wherein said lime slurry contains calcium oxide present in an amount of from 15 to 25% by weight.

7. A method of disposing of waste mercury sludges containing calcium carbonate and metallic mercury comprising: mixing said sludges with at least an equal amount by weight of spent pickle liquor containing sulphuric acid to convert the metallic mercury into a mercuric sulphate compound; and neutralizing the mixture with a heavy lime slurry to obtain a solid mass portion containing insoluble mercuric carbonate and a liquid portion containing less than 10 parts per billion of soluble mercury.

8. A method according to claim 7 wherein said lime slurry contains from 5 to 28% by weight of calcium oxide.

9. A method according to claim 7 wherein said lime slurry contains from 15 to 25% by weight of calcium oxide.

10. A method according to claim 7 wherein the ratio of said pickle liquor to said sludge ranges from about one to one by weight to twenty to one by weight.

11. A method according to claim 7 wherein the ratio of said pickle liquor to said sludge is about ten to one by weight.

References Cited
UNITED STATES PATENTS

| | | | |
|---|---|---|---|
| 3,695,838 | 10/1972 | Knepper et al. | 75—121 |
| 3,476,552 | 11/1969 | Parks et al. | 75—121 |
| 2,846,305 | 8/1958 | Ashley et al. | 75—121 |

SAMIH N. ZAHARNA, Primary Examiner

B. CASTEL, Assistant Examiner

U.S. Cl. X.R.

210—53